(12) United States Patent
Yang

(10) Patent No.: US 6,966,507 B2
(45) Date of Patent: Nov. 22, 2005

(54) ELECTRIC COFFEE GRINDER

(76) Inventor: Heng-Te Yang, P.O. Box 90, Tainan City (TW)

( * ) Notice: Subject to any disclaimer, the term of this patent is extended or adjusted under 35 U.S.C. 154(b) by 139 days.

(21) Appl. No.: 10/681,154

(22) Filed: Oct. 9, 2003

(65) Prior Publication Data

US 2005/0077403 A1 Apr. 14, 2005

(51) Int. Cl.[7] .............................................. A47J 42/06
(52) U.S. Cl. .................................. 241/100; 241/169.1
(58) Field of Search ......................... 99/510; 241/100, 241/168, 169, 169.1

(56) References Cited

U.S. PATENT DOCUMENTS 5,022,951 A * 6/1991 Behlmer et al. ............ 156/379
6,377,022 B1 * 4/2002 Rhoads ....................... 320/115
2004/0065213 A1 * 4/2004 Cheng ......................... 99/510

FOREIGN PATENT DOCUMENTS

DE 2646935 * 8/1978
JP 2002-263012 * 9/2002

* cited by examiner

Primary Examiner—Mark Rosenbaum

(57) ABSTRACT

An electric coffee grinder in the invention has a body, a holding seat, a motor seat, a fixing seat, a base, a receiving basket, a feeding basket and an upper cover. The electric coffee grinder can be supplied electricity by batteries press button of the body is depressed by a user, a button switch will be actuated by the press button to form an open electric circuit to start a motor to rotate a reducing gear assembly to turn a journal to swivel a spindle to turn a grinding member, thereby enabling the electric coffee grinder of the invention to proceed with grinding movements, which is quick in grinding, compact in dimension and convenient in operation.

6 Claims, 4 Drawing Sheets

ELECTRIC COFFEE GRINDER

BACKGROUND OF THE INVENTION

1. Field of the Invention

This invention relates to an electric coffee grinder, particularly to one capable of being supplied electricity by batteries so that when a press button of the body is depressed by a user, a button switch will be actuated by the press button to form an open electric circuit to start a motor to rotate a reducing gear assembly to turn a journal to swivel a spindle to turn a grinding member, thereby enabling the electric coffee grinder of the invention to proceed with grinding movements quickly.

2. Description of the Prior Art

Generally speaking, as shown in FIG. 1, a known conventional coffee grinder 1 mainly has a base 10, a container body 11 disposed in the base 10, and a grinding device 12 assembled above the base 10. The grinding device 12 has a fixing seat 13, a spindle 14 and a cover 122. The fixing seat 13 is disposed at a lower portion of the grinding device 12 for being connected with the base 10. The spindle 14 has an upper end connected with a crank handle 15 and a lower end combined with a grinding member 120 and a grinding seat 121 for grinding coffee beans. The cover 122 is provided with an opening 16 attached with a sliding plate 17. In using, firstly place the coffee beans to be ground into the grinding device 12 through the opening 16, and then close the sliding plate 17. Secondly, press against the grinding device 12 with one hand, and then hold and rotate the crank handle 15 with the other hand to turn the grinding member 120, by which the coffee beans that have been placed between grinding teeth of the grinding seat 121 and the grinding member 120 engaged with each other will be ground into powder and drop out of a lower end of the fixing seat 13 to be collected in the container 11 of the base 10. After all the coffee beans are ground into powder, the ground coffee powder will be fallen from the container 11 of the base 10 and ready for use.

However, the conventional manual-operated coffee grinder 1 is labor-consuming and time-consuming when grinding larger amount of coffee beans. In fact, users often feel very uncomfortable in hands after operating the conventional coffee grinder 1 for such a longer time.

Therefore, an improved electric coffee grinder with a plug is designed to overcome the conventional coffee grinder 1 by using electricity instead of man's power. However, the electric coffee grinder requires a supply of electricity by inserting the plug into a receptacle, which is convenient in using indoors, but very troublesome in using outdoors. Moreover, the electric coffee grinder is bulky in dimension, which is very inconvenient in transportation.

SUMMARY OF THE INVENTION

The main purpose of the invention is to offer an electric coffee grinder, convenient in operation.

The main feature of the invention is to provide an electric coffee grinder mainly including:

a body having a compartment disposed therein and a through hole disposed on a wall surface thereof;

a holding seat positioned in the compartment of the body, and having a cover plate disposed at an upper end thereof and a passage disposed therein;

a motor seat positioned in the compartment of the body and below the holding seat, the motor seat having a passage disposed therein at a position aligned with the passage of the holding seat, a through hole disposed on a wall surface thereof at a position aligned with the through hole of the body, a motor chamber disposed therein, at least one battery chamber disposed therein, a recessed chamber disposed in a lower portion thereof, and a positioning seat disposed at a bottom thereof, the motor chamber having a motor disposed therein and provided with an axle extending into the recessed chamber and a driving gear coupled to the axle, the at least one battery chamber each having at least one battery disposed therein, the recessed chamber having a reducing gear assembly disposed therein and meshed with the driving gear, the positioning seat having a hole disposed thereon for being extended through by a gear of the reducing gear assembly, a passage disposed therein at a position aligned with the passage of the motor seat, and a button switch disposed thereon, the button switch having a press button disposed thereon and capable of being protruded out of the through holes of the motor seat and the body;

a fixing seat disposed at a bottom of the compartment of the body and below the positioning seat, and having a hole disposed thereon, a compartment disposed therein, and an opening disposed thereon at a position aligned with the passages of the holding seat, the motor seat as well as the positioning seat;

a base secured below the body, and having a supporting recess disposed thereon, a recessed chamber disposed in the supporting recess, a holder disposed at a bottom of the recessed chamber, a plurality of through holes disposed at the bottom of the recessed chamber, a fixing disk secured above the supporting recess, a grinding seat secured in the fixing disk, a grinding member received in the grinding seat, a spindle, a journal, an adjusting knob and a spring, the holder provided with a threaded hole disposed thereon, the fixing disk provided with an aperture disposed thereon, the grinding seat having a plurality of internal grinding teeth disposed on an inner wall surface thereof, the grinding member having a bore disposed therein and a plurality of external grinding teeth disposed on an outer wall surface thereof, the spindle capable of extending through the bore of the grinding member, the journal capable of extending through the hole of the fixing seat and having an upper portion provided with a driven gear and a lower portion capable of being inserted by an upper end of the spindle, the adjusting knob capable of being sleeved on by the spring and screwed with the threaded hole of the holder;

a feeding basket capable of being assembled above the body and having an opening disposed at a bottom thereof; and, an upper cover capable of being covered on an upper end of the feeding basket.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
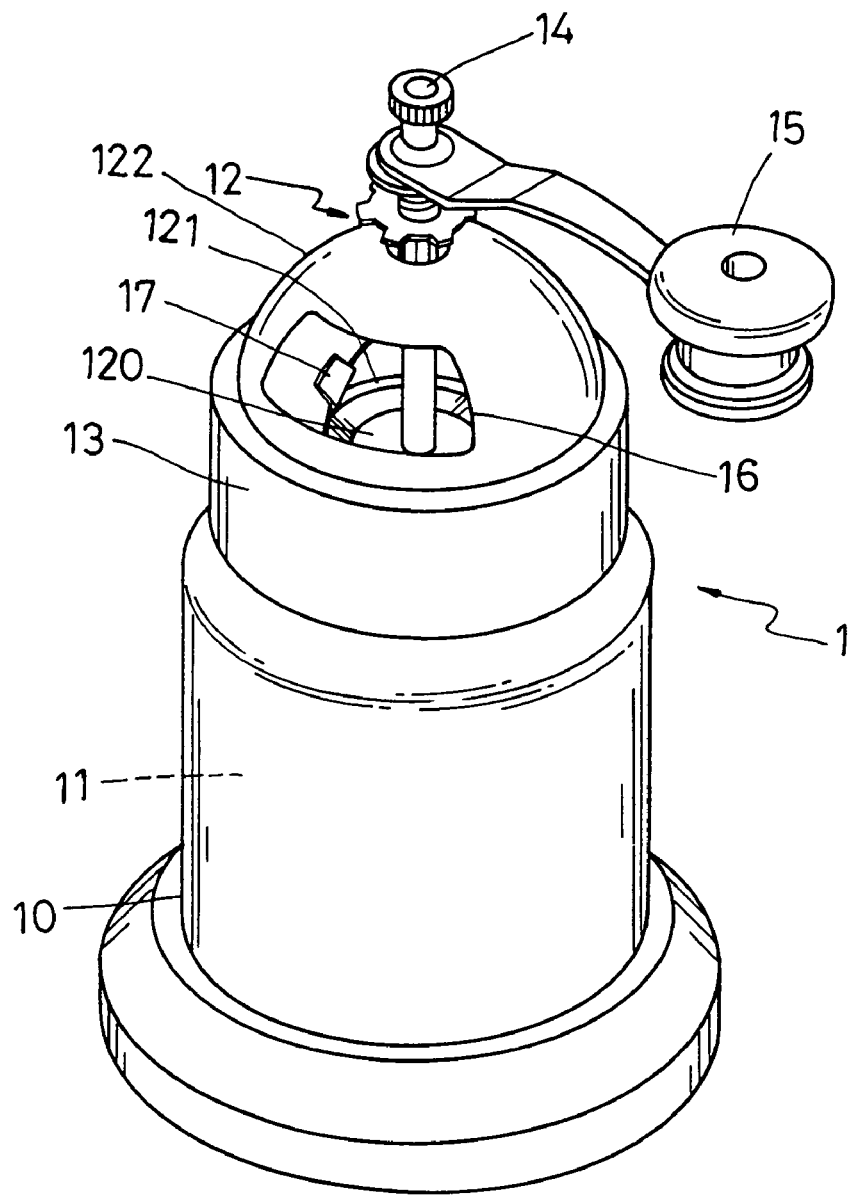
FIG. 1 is a schematic view of a known conventional coffee grinder in use.
Figure 2:
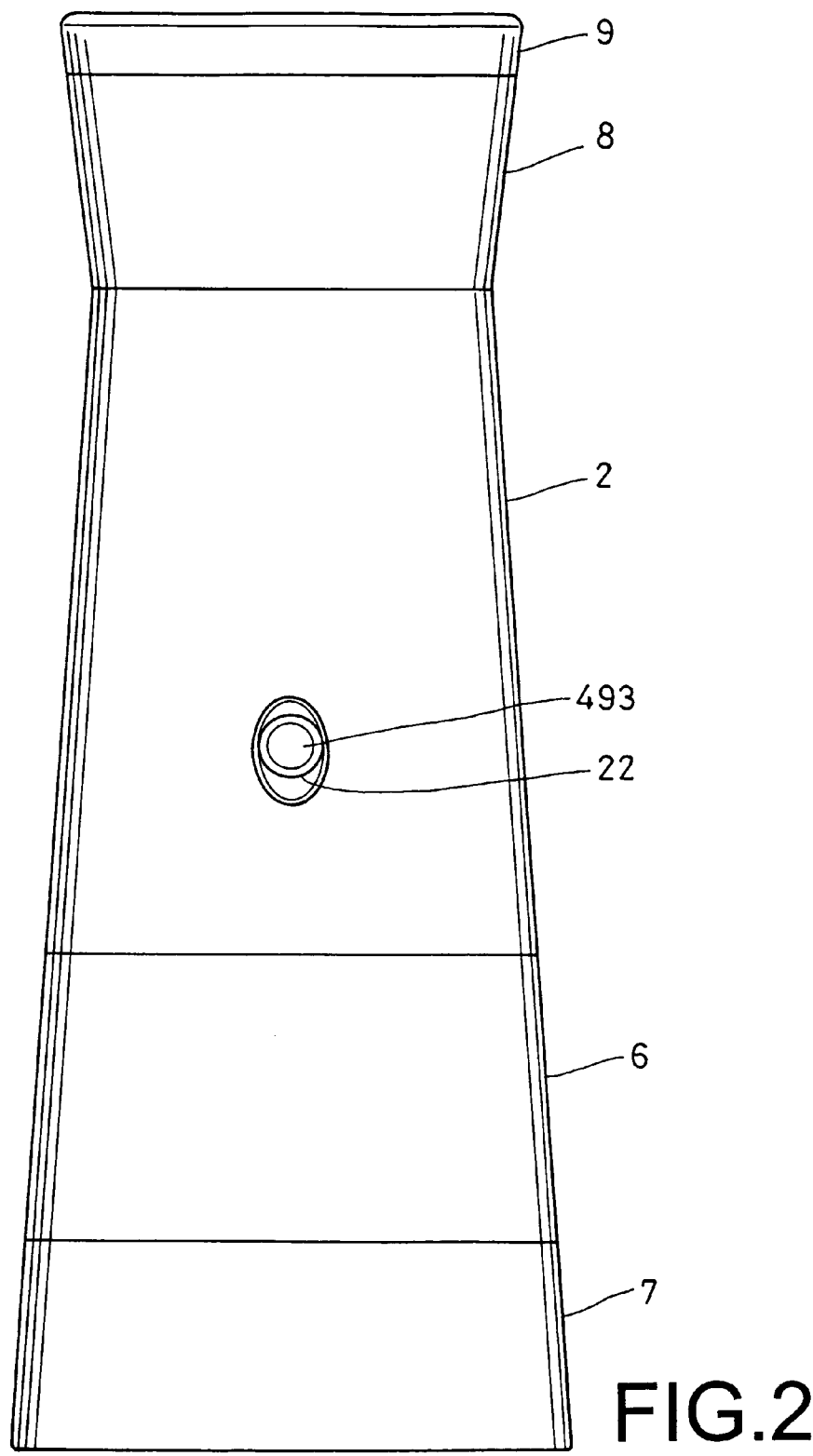
FIG. 2 is an elevational view showing an appearance of an electric coffee grinder in the present invention.
Figure 3:
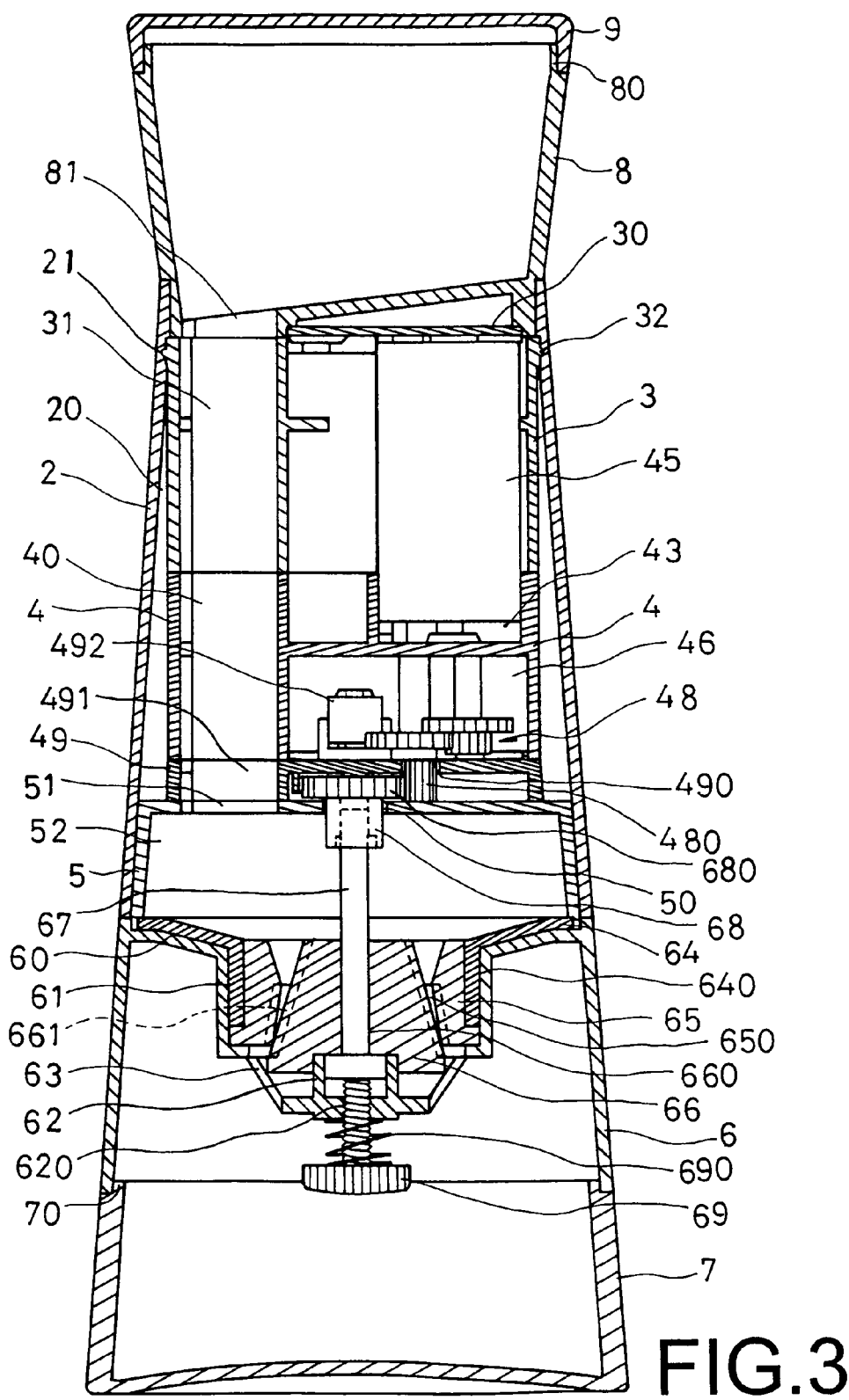
FIG. 3 is a sectional view showing an assemblage of the electric coffee grinder in the present invention; and, FIG. 4 is another sectional view showing the assemblage of the electric coffee grinder in the present invention.
Figure 4:
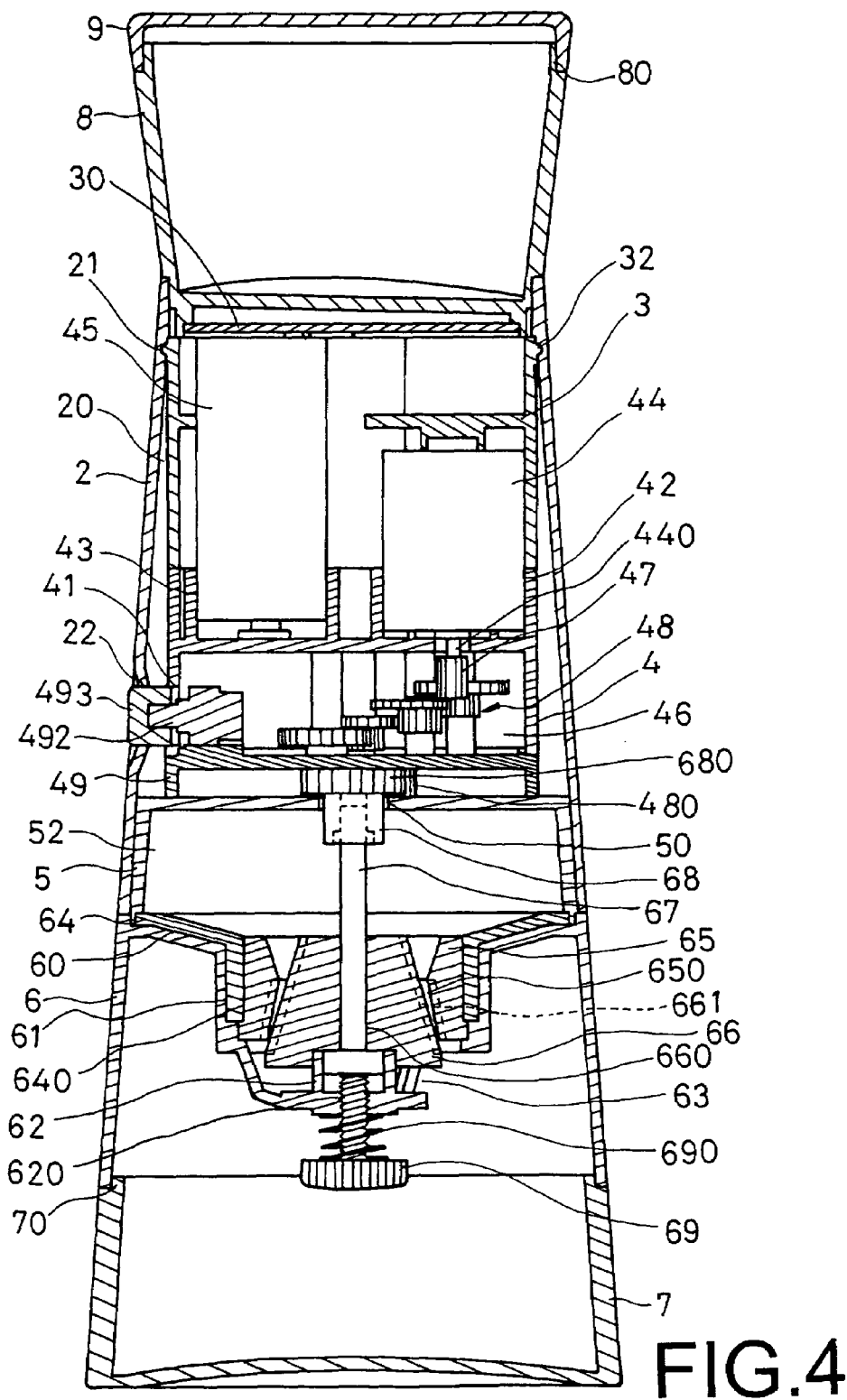

A preferred embodiment of an electric coffee grinder in the present invention, as shown in FIGS. 2, 3 and 4, mainly includes a body 2, a holding seat 3, a motor seat 4, a fixing seat 5, a base 6; a receiving basket 7, a feeding basket 8 and an upper cover 9.

The body 2 has a compartment 20 disposed therein, an annular groove 21 disposed near an upper end thereof, and a through hole 22 disposed on a wall surface thereof.

The holding seat 3 positioned in the compartment 20 of the body 2 has a cover plate 30 disposed at an upper end thereof, a passage 31 disposed therein, and a flanged ring 32 disposed near an upper end of an outer wall surface thereof for being engaged in the annular groove 21 of the compartment 20 of said body 2.

The motor seat 4 positioned in the compartment 20 of the body 2 and below the holding seat 3 has a passage 40 disposed therein at a position aligned with the passage 31 of the holding seat 3, a through hole 41 disposed on a wall surface thereof at a position aligned with the through hole 22 of the body 2, a motor chamber 42 disposed therein, a battery chamber 43 disposed therein, a recessed chamber 46 disposed in a lower portion thereof, and a positioning seat 49 disposed at a bottom thereof. The motor chamber 42 has a motor 44 disposed therein and provided with an axle 440 extending into the recessed chamber 46 and a driving gear 47 coupled to the axle 440. The battery chamber 43 has a battery 45 disposed therein. The recessed chamber 46 has a reducing gear assembly 48 disposed therein and meshed with the driving gear 47. The positioning seat 49 has a hole 490 disposed thereon for being extended through by a gear 480 of the reducing gear assembly 48, a passage 491 disposed therein at a position aligned with the passage 40 of the motor seat 4, and a button switch 492 disposed thereon. The button switch 492 has a press button 493 disposed thereon and capable of being protruded out of the through holes 41, 22 of the motor seat 4 and the body 2.

The fixing seat 5 positioned at a bottom of the compartment 20 of the body 2 and below the positioning seat 49 has a hole 50 disposed in a center thereof, a compartment 52 disposed therein, and an opening 51 disposed thereon at a position aligned with the passages 31, 40, 491 of the holding seat 3, the motor seat 4 as well as the positioning seat 49.

The base 6 capable of being welded securely below the body 2 by an ultrasonic welding way has a supporting recess 60 disposed thereon, a recessed chamber 61 disposed in a center of the supporting recess 60, a holder 62 disposed at a bottom of the recessed chamber 61, a plurality of through holes 63 disposed at the bottom of the recessed chamber 61, a fixing disk 64 secured above the supporting recess 60, a grinding seat 65 secured in the fixing disk 64, a grinding member 66 received in the grinding seat 65, a spindle 67, a journal 68, an adjusting knob 69 and a spring 690. The holder 62 is provided with a threaded hole 620 disposed thereon. The fixing disk 64 is provided with an aperture 640 disposed in a center thereof. The grinding seat 65 has a plurality of internal grinding teeth 650 disposed on an inner wall surface thereof. The grinding member 66 has a bore 660 disposed therein and a plurality of external grinding teeth 661 disposed on an outer wall surface thereof. The spindle 67 is capable of extending through the bore 660 of the grinding member 66. The journal 68 capable of extending through the hole 50 of the fixing seat 5 has an upper portion provided with a driven gear 680 and a lower portion capable of being inserted by an upper end of the spindle 67. The adjusting knob 69 is capable of being sleeved on by the spring 690 and screwed with the threaded hole 620 of the holder 62.

The receiving basket 7 capable of being assembled below the base 6 has an engagement edge 70 protruded upwardly at an upper end thereof.

The feeding basket 8 capable of being assembled above the body 2 has an engagement edge 80 protruded upwardly at an upper end thereof and an opening 81 disposed at a bottom thereof.

The upper cover 9 is capable of being covered on an upper end of the feeding basket 8.

In using, referring to FIGS. 2, 3 and 4, firstly remove the upper cover 9 from the feeding basket 8, place the coffee beans to be ground into the feeding basket 8, and then cover the upper cover 9 on the feeding basket 8 again, by which the coffee beans to be ground will move downwardly from the feeding basket 8, through the opening 81 of the feeding basket 8, the passages 31, 40, 491 of the supporting seat 3, the motor seat 4 as well as the positioning seat 491, the opening 51 of the fixing seat 5, into the compartment 52 of the fixing seat 5, and further slide into the aperture 640 of the base 6 to be deposited between the grinding seat 65 and the grinding member 66, waiting for being ground. Finally, depress the press button 493 of the body 2, by which the button switch 492 will be actuated by the press button 493 and supplied electricity by the battery 45 to form an open electric circuit to start the motor 44 to make the axle 440 of the motor 44 turn the driving gear 47 to rotate the reducing gear assembly 48 meshed with the driving gear 47 to make the gear 480 of the reducing gear assembly 48 turn the driven gear 680 6f the journal 68 meshed with the gear 480 to swivel the spindle 67 to turn the grinding member 66, thereby enabling the electric coffee grinder of the invention to grind the coffee beans that has been deposited between the external grinding teeth 661 of the grinding member 66 and the internal grinding teeth 650 of the grinding seat 65. The coffee beans can be ground into powder and drop out of a lower end of the base 6 to be collected in the receiving basket 7. After all the coffee beans are ground into powder, the user can disassemble the receiving basket 7 from the base 6 to fall the ground coffee powder out of the receiving basket 7, by which the ground coffee powder is ready for use.

Furthermore, an adjustment of the adjusting knob 69 to press the spindle 67 up or down is capable of moving the grinding member 66 up or down accordingly to adjust the gap between the grinding member 66 and the grinding seat 65, thereby allowing the coffee beans to be ground into powder of different sizes, very convenient in operation.

While the preferred embodiment of the invention has been described above, it will be recognized and understood that various modifications may be made therein and the appended claims are intended to cover all such modifications that may fall within the spirit and scope of the invention.

What is claimed is:

1. An electric coffee grinder comprising:
    a body having a compartment disposed therein and a through hole disposed on a wall surface thereof;
    a holding seat positioned in said compartment of said body, and having a cover plate disposed at an upper end thereof and a passage disposed therein;
    a motor seat positioned in said compartment of said body and below said holding seat, said motor seat having a passage disposed therein at a position aligned with said passage of said holding seat, a through hole disposed on a wall surface thereof at a position aligned with said through hole of said body, a motor chamber disposed therein, at least one battery chamber disposed therein, a recessed chamber disposed in a lower portion thereof, and a positioning seat disposed at a bottom thereof, said motor chamber having a motor disposed therein and provided with an axle extending into said recessed chamber and a driving gear coupled to said axle, said at least one battery chamber each having at least one battery disposed therein, said recessed chamber having a reducing gear assembly disposed therein and meshed with said driving gear, said positioning seat having a hole disposed thereon for being extended through by a gear of said reducing gear assembly, a passage disposed therein at a position aligned with said passage of said motor seat, and a button switch disposed thereon, said button switch having a press button disposed thereon and capable of being protruded out of said through holes of said motor seat and said body;

a fixing seat disposed at a bottom of said compartment of said body and below said positioning seat, and having a hole disposed thereon, a compartment disposed therein, and an opening disposed thereon at a position aligned with said passages of said holding seat, said motor seat as well as said positioning seat;

a base secured below said body, and having a supporting recess disposed thereon, a recessed chamber disposed in said supporting recess, a holder disposed at a bottom of said recessed chamber, a plurality of through holes disposed at said bottom of said recessed chamber, a fixing disk secured above said supporting recess, a grinding seat secured in said fixing disk, a grinding member received in said grinding seat, a spindle, a journal, an adjusting knob and a spring, said holder provided with a threaded hole disposed thereon, said fixing disk provided with an aperture disposed thereon, said grinding seat having a plurality of internal grinding teeth disposed on an inner wall surface thereof, said grinding member having a bore disposed therein and a plurality of external grinding teeth disposed on an outer wall surface thereof, said spindle capable of extending through said bore of said grinding member, said journal capable of extending through said hole of said fixing seat and having an upper portion provided with a driven gear and a lower portion capable of being inserted by an upper end of said spindle, said adjusting knob capable of being sleeved on by said spring and screwed with said threaded hole of said holder;

a feeding basket capable of being assembled above said body and having an opening disposed at a bottom thereof;

an upper cover capable of being covered on an upper end of said feeding basket; and, whereby when said press button of the body is depressed by a user, said button switch will be actuated by said press button to form an open electric circuit to start said motor to rotate said reducing gear assembly to turn said journal to swivel said spindle to turn said grinding member, thereby enabling said electric coffee grinder to proceed with grinding movements, which is quick in grinding, compact in dimension and convenient in transportation for being used outside.

2. The electric coffee grinder as claimed in claim 1, wherein a receiving basket is capable of being assembled below said base for being received with ground coffee powder therein.

3. The electric coffee grinder as claimed in claim 2, wherein said receiving basket has an engagement edge protruded upwardly at an upper end thereof for being engaged with a lower end of said base.

4. The electric coffee grinder as claimed in claim 2, wherein said receiving basket has an engagement edge protruded upwardly at an upper end thereof for being covered by said upper cover.

5. The electric coffee grinder as claimed in claim 1, wherein said compartment of said body has an annular groove disposed near an upper end thereof; wherein said holding seat has a flanged ring disposed near an upper end of an outer wall surface thereof for being engaged in said annular groove of said compartment of said body.

6. The electric coffee grinder as claimed in claim 1, wherein said body and said base are capable of being welded together by an ultrasonic welding way.

* * * * *